United States Patent [19]

Bausch

[11] Patent Number: 5,426,354
[45] Date of Patent: Jun. 20, 1995

[54] VECTOR CONTROL FOR BRUSHLESS DC MOTOR

[75] Inventor: James Bausch, West Linn, Oreg.

[73] Assignee: Synektron Corporation, Portland, Oreg.

[21] Appl. No.: 340,070

[22] Filed: Nov. 15, 1994

[51] Int. Cl.⁶ ............................................. H02P 6/20
[52] U.S. Cl. .................... 318/254; 318/431; 388/801
[58] Field of Search ............... 318/599, 608, 138, 254, 318/430, 431, 439; 388/801, 804, 805, 811, 812, 813, 819, 820

[56] References Cited

U.S. PATENT DOCUMENTS

| | | | |
|---|---|---|---|
| 4,651,068 | 3/1987 | Meshkat-Razavi | 318/254 |
| 4,928,043 | 5/1990 | Plunkett. | |
| 5,006,768 | 4/1991 | Rozman | 318/254 |
| 5,015,939 | 5/1991 | Konecny. | |
| 5,034,668 | 7/1991 | Bausch. | |
| 5,043,643 | 8/1991 | Hedlund et al. | 318/254 |
| 5,223,775 | 6/1993 | Mongeau | 318/432 |
| 5,334,917 | 8/1994 | Lind | 318/254 |
| 5,384,527 | 1/1995 | Rozman et al. | 322/10 |

*Primary Examiner*—Bentsu Ro
*Attorney, Agent, or Firm*—Chernoff, Vilhauer

[57] ABSTRACT

A control circuit and method for controlling an electric machine has a plurality of stator windings energized by current signals. The control circuit includes a driver circuit that generates three pulse width modulated current signals responsive to an error signal that is representative of a phase angle error, where each of the respective current signals is one phase of a three phase signal. The driver circuit also generates phase information associated with the current signals. The machine has three input terminals each of which receives a respective one of the three current signals generated by the driver circuit. A multiply circuit multiplies the terminal voltage of at least one of the three terminals with the phase information to generate the error signal.

10 Claims, 10 Drawing Sheets

VECTOR CONTROL FOR BRUSHLESS DC MOTOR

BACKGROUND OF THE INVENTION

The following invention relates to a control circuit for an electric motor and more particularly to a vector control circuit to control a DC brushless motor.

Existing sensorless six step motor drivers encounter severe starting problems because of harmonic noise present at the motor terminals caused by large torque variations in the excitation waveforms provided to the motor terminals from the motor driver. As an example, when the first pulse (after the homing pulse) is applied to the motor terminals using a six step motor driver, the torque on the motor steps from zero torque to 83 percent of the maximum torque. It is nearly impossible to accurately predict the position of the rotor in the motor when a second pulse is applied to the motor terminals. Without predictability of the rotor position the motor will almost inevitably experience a rough start. Motor driver designers have attempted to obtain a smoother motor start by employing additional damping resistors at the motor terminals, or using some form of mechanical damping applied to the rotor of the motor. Although such damping techniques result in an improvement in starting, the large torque variations are not eliminated, accordingly starting problems still persist. Additionally, the damping increases the time required for the rotor to reach full speed. Furthermore, turning on and off each phase six times for each revolution of the rotor introduces harmonic content into the interior motor waveforms which results in more frequencies which can in turn cause resonances resulting in unwanted acoustic noise.

In U.S. Pat. No. 5,034,668, assigned to the same assignee, the motor flux is determined dynamically by sensing the current and voltage at the motor terminals. The quadrature relation of flux and current is established by converting the three phase motor flux to a derived two phase motor flux, and employing a phase locked loop to generate the driving current from the derived motor flux. The two phase representation of the flux is converted to three phases to drive the motor. The use of the conversion matrices complicates and adds additional expense to the motor driver. To actually measure the motor flux, additional expense is incurred by requiring a flux sensor on the motor. Additionally, the value of the motor inductance and resistance has to be predetermined for each different motor type to allow component values in the driver circuit to be properly set. Without making a proper measurement of the particular motor's inductance and resistance, the measured flux will be in error causing operational problems. Further, the flux detector circuit employs an integrator circuit that tends to make inaccurate measurements at slow rotor speeds (during operation and startup), because of the required bleeder resistors across the integrating capacitor.

A typical motor speed control device allows for at most 24 speed updates of the rotor per revolution. This becomes an undesirable limiting bandwidth of the device. Plunkett, U.S. Pat. No. 4,928,043 discloses an example of such a device.

What is therefore desired is a motor driver that minimizes motor torque variations when starting and allows for a faster startup time. The bandwidth of the device should be increased substantially to allow for finer speed control. Additionally, during operation the interior motor waveforms should have minimal harmonic content to minimize acoustic noise.

SUMMARY OF THE PRESENT INVENTION

The present invention overcomes the aforementioned drawbacks of the prior art by providing a control circuit and method for controlling an electric machine which has a plurality of stator windings energized by current signals. The control circuit includes a driver circuit that generates pulse width modulated current signals responsive to an error signal that is representative of a phase angle error, where each of the respective current signals is one phase of a multi-phase signal. The driver circuit also generates phase information associated with the current signals. The machine has a plurality of input terminals, each of which receives a respective one of the current signals generated by the driver circuit. A multiplier circuit for multiplying the terminal voltage of at least one of the terminals with the phase information to generate the error signal.

The preferred multiplier circuit multiplies the terminal voltage of each of the terminals of the machine with the phase information to generate multiplication signals. Thereafter, the multiplication signals are summed together to generate the error signal.

The preferred driver circuit includes a first counter that recursively generates first binary values from zero to 127 and a second counter that recursively generates second binary values, responsive to the error signal, from zero to 63. When the first counter reaches 127 a carry out signal is generated that causes a latch circuit to receive a selected one of the second binary values. An EPROM generates digital data in response to simultaneously addressing the EPROM with both the selected one of the second binary values and a series of first binary values. A generator circuit produces the pulse width modulated current signals in response to the digital data.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
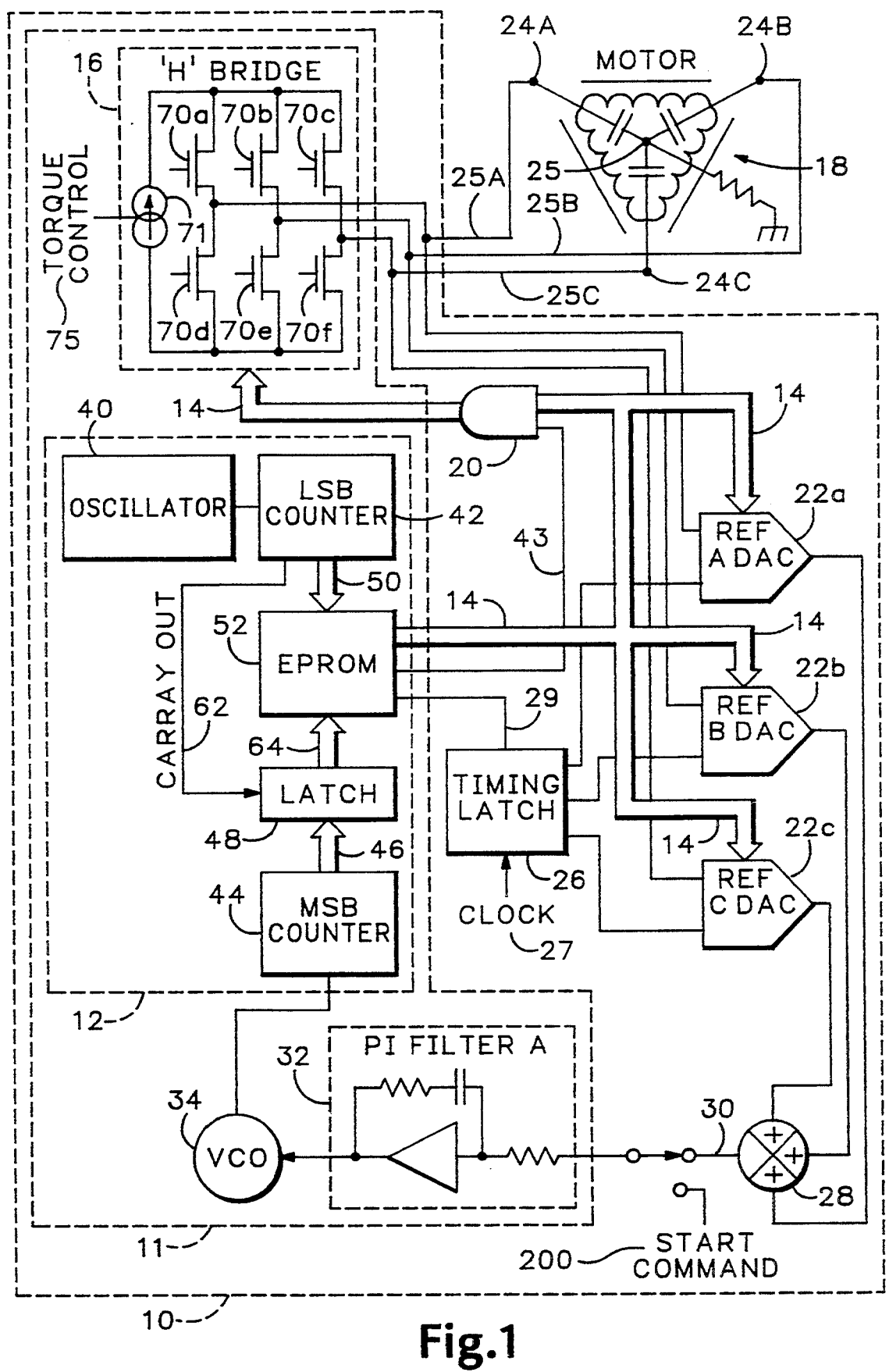
FIG. 1 is a schematic block diagram of a control circuit for a DC machine utilizing a vector control driver.

Referring to FIG. 1, a motor controller 10 uses a driver circuit 11 that generates pulse width modulated current waveforms to drive a motor 18. The driver circuit 11 includes a pulse width modulator driver 12 to provide digital data to a system bus 14. The digital data is representative of the pulse width modulated current waveforms and phase information related to the current waveforms. The digital data is received by an H bridge 16 which in turn generates three pulse width modulated current waveforms which are each received by a respective one of the three terminals of the motor 18. The terminal voltage on each of the three motor terminals are used to indicate rotor position in the motor 18 to permit control of the motor torque, position and velocity. The three terminal voltages of the motor 18 are sensed by respective digital-to-analog converter's (DACs) 22a, 22b, and 22c. The DACs 22a–22c multiply the respective terminal voltage with the phase information to generate three multiplication signals. Preferably, the phase information includes three different digital words, each of which is representative of the cosine of the phase angle of one phase of the three phase pulse width modulated current waveforms. The three multiplication signals are summed together by a summer 28 to produce a total phase error signal. The total phase error signal is received by a PI Filter A 32, one function of which is to produce a non-zero output for a zero input. The output of the PI Filter A 32 is received by a voltage controlled oscillator (VCO) 34. The VCO 34 generates a signal that is received by the PWM driver 12 to select the appropriate digital data for the pulse width modulated current waveforms for the motor 18.

Referring to FIG. 1, the motor controller 10 uses a vector controlled motor driver to start and drive the motor 18. The preferred motor is a brushless DC motor. The motor controller 10 includes the driver circuit 11 for controlling the motor 18. The pulse width modulator driver (PWM driver) 12 is included in the driver circuit 11 to provide digital data to the system bus 14. The digital data is representative of three phase pulse width modulated current waveforms or signals to be supplied to three input terminals of the motor 18.

Referring more specifically to the PWM driver 12, a pulse width modulator (PWM) oscillator 40 operates as a clock to drive a least significant bit (LSB) counter 42. The LSB counter 42 preferably counts from zero to 127 (128 bytes), producing a binary output on bus 50 representative of the LSB counter's present value. After generating the number 127 the LSB counter 42 generates a carry out signal on line 62 on the next count while an output of zero is provided to the bus 50. Bus 50 has seven lines to allow representation of a value of 127. Preferably the PWM oscillator 40 operates at 5 MHZ which has been found to provide a sufficient resolution of the PWM current waveform and within the capability of a standard EPROM 52. A most significant bit (MSB) counter 44 is driven by the voltage controlled oscillator (VCO) 34. The VCO 34 preferably operates at 64 times the electrical frequency of the motor 18. The MSB counter 44 recursively counts from zero to 63 (64 bytes) producing binary data representative of its present value on bus 46. Bus 46 has six lines to accommodate the 64 different bytes. The data from the MSB counter 44 is provided to the input of a latch 48.

The LSB counter 42 cycles through zero to 127 which are used as inputs to the seven least significant address lines of the EPROM 52. When the LSB counter 42 generates a carry out signal the latch 48 is triggered. When the latch 48 is triggered, the data on bus 46 is received by the latch 48. The carry out signal on line 62 ends with the next count of the LSB counter 42 and the latch 48 is therefore deselected. The data which was received in the latch 48, while the latch 48 was triggered, is maintained until the next carry out signal on line 62 occurs from the LSB counter 42. In other words, the latch 48 only receives data from the MSB counter 44 when a carry out signal is present on line 62. The data in the latch 48 is provided on a bus 64 which are used as inputs to the six most significant address lines of the EPROM 52. Preferably, the EPROM 52 has a storage capability of 8192 bytes to permit full addressing of a 13 bit address (six for the MSBs plus seven for the LSBs) and the preferred chip is a Microchip 120 ns 27C64 (64 k bit).

Digital information in the EPROM 52 is organized into 64 frames which correspond with the number of different values from the MSB counter 44. Each frame of digital information is further divided into 128 sets of digital information, which corresponds with the number of different values from the LSB counter 42. In other words, each of the 64 frames of digital information contained within the EPROM 52 has 128 different sets of digital information contained therein, for a total of 8192 bytes (64*128).

During operation of the motor 18, the MSB counter 44 maintains a constant value on the six most significant address lines of the EPROM 52 while the LSB counter 42 increments the value on the seven least significant address lines of the EPROM 52, from zero to 127, to provide sets of digital data on the system bus 14. When the LSB counter 42 generates a carry out signal as it returns to zero, the latch 48 receives whatever data is currently supplied by the MSB counter 44 on the bus 46. The next count of the LSB counter 42 ends the carry out signal isolating the latch 48 from the MSB counter 44. The latch 48 now has an updated value corresponding to whatever value is present on the MSB counter 44 prior to deselecting the latch 48. The frequency of the digital data supplied to the system bus 14 using this particular design has a resolution of approximately 200 ns (5 MHz clock/128 bytes of the LSB counter 42=39062.5 Hz).

One main function of the latch 48 is to prevent the MSB counter 44 from changing the value of the six most significant address lines of the EPROM 52 while the LSB counter 42 is counting from zero to 127. To do otherwise may result in the generation of digital data from two or more frames. The LSB counter 42 and MSB counter 44 may be varied in the number and direction of counting, so long as the EPROM 52 provides the desired digital data with a sufficient resolution. While the preferred embodiment is functional, other circuit designs may also be used to provide digital data indicative of a PWM waveform in response to a phase error.

The phase information for the driving waveform (PWM current waveform) of the motor 18 is interleaved in the EPROM 52 with the digital information. In the preferred embodiment, there are three words of phase information, each word having six bits, that are located in the first six words of each frame. The EPROM 52 provides the phase information to the system bus 14 in the same manner as the digital waveform data. During the time that the phase information is provided to the system bus 14, gate 20 is deselected by deactivating line 43 which isolates the H bridge 16 (to be described later) while the timing latch 26 is selected by activating line 29. The timing latch 26 is operated by a 5 MHz clock 27 which matches the frequency of the oscillator 40. The oscillator 40 and clock 27 may be the same device. Each of the three words of phase information respectively represents the phase angle of each of the three phases of the current waveform that is provided in that particular frame of the total pulse width modulated current waveform. The timing latch 26 selects in sequence, DAC 22A during the zero and first clock periods, DAC 22B during the second and third clock periods, and DAC 22C during the fourth and fifth clock periods, each respectively receiving phase information related to phase A, B, and C of the current waveform of that frame from the system bus 14. Accordingly, phases A, B and C from the PWM driver 12 are latched into the DAC's 22a, 22b, and 22c during clock periods 0-1, 2-3, and 4-5, respectively. The clock periods for zero through five refer to the first six counts of the LSB counter 42 at the beginning of each frame. These six clock periods represent 1.2 micro seconds of dead space for the PWM current waveform. Each word of the phase information uses two clock periods to provide sufficient wait states for the latches of the DAC's 22a, 22b, and 22c to accept the data.

During time periods other than six clock periods used for phase information, the gate 20 is selected by activating line 43 so that digital data on the system bus 14 may be received by the H Bridge 16, while the timing latch 26 is deselected by deactivating line 29 to isolate the DAC's 22a, 22b, and 22c from the system bus 14. The system bus 14 preferably uses six lines to carry the PWM current waveform information. Each of the system bus 14 lines operates an individual gate 70a, 70b, 70c, 70d, 70e, and 70f within the H Bridge 16. The H Bridge 16 outputs three pulse width modulated current signals, each of which is one phase of a three phase signal and uses a respective separate line 25a, 25b, and 25c to the motor 18.

The desired PWM current waveform is comprised of three distinct current values, namely, positive, negative, or off. The positive and negative currents are each of the same magnitude, but of opposite polarity. To generate the desired pulse width modulation current waveform, two input terminals of the motor 18 are supplied a current of a given polarity, while the third input terminal of the motor 18 is supplied current with the opposite polarity from the other two input terminals. The opposite polarity may be referred to as the unique polarity. Preferably, the three currents have the same magnitude if non-zero. For example, phase A might have a positive current, phase B a positive current, and phase C a negative current, all of which have the same magnitude. The polarity of the unique current is 'on', either as positive or negative current, for the full frame period. The other two currents are 'on', either both positive or both negative, for half of the frame period with each using a different half of the frame period. With the present selection scheme the currents into the three input terminals of the motor 18 are not constant, being supplied for 100% of the frame period when none of the currents are zero, and being supplied 86.66% when one of the currents is zero for the entire frame period (excluding the time for phase information). However, the PWM currents into the motor terminals 24a, 24b, and 24c are what are required for constant torque, since the magnitudes of each phase of the current waveforms are always constant. To produce these currents a current source 71 supplies a positive current through gates 70a, 70b, or 70c, which are preferably FET's, into the motor 18 while simultaneously supplying a negative current from the motor 18 through gates 70d, 70e, and 70f, which are preferably FET's. A torque control 75 can be adjusted to select the magnitude of the current supplied by the current source 71.

Figure 6:
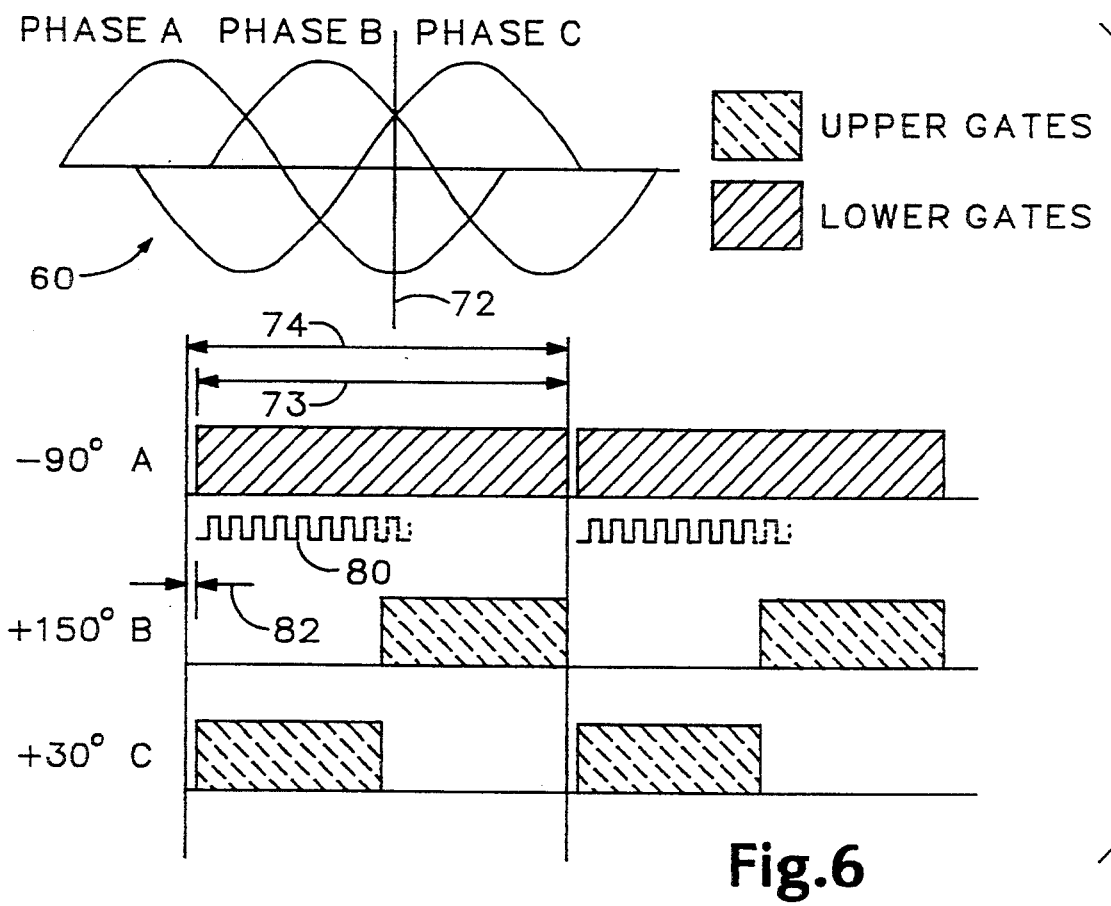
FIG. 6 is a pulse width modulated current waveform of a three phase current when phase A is −90 degrees for the control circuit of FIG. 1.

Referring to FIG. 6, the desired three phase current waveform 60 is shown. The waveform 60 may be generated by three pulse width modulated signals to create a relatively smooth current waveform. At time 72 of waveform 60 phase A has an angle of −90 degrees, phase B has an angle of +150, and phase C has an angle of +30 degrees. To generate a pulse width modulated signal corresponding to time 72 gate 70d is activated to provide a negative current during the current waveform period 73 of frame period 74. During the first half of the waveform period 73 phase C is provided with a positive current by activating gate 70c. Similarly, for the second half of the waveform period 73 phase B is provided with a positive current by activating gate 70b. During frame period 74 there are 128 sets of digital data as indicated by the clock representation 80 of the LSB counter 42. Near the beginning of the frame period 74 is a time period 82 where the phase information is provided, as previously described.

Figure 7:
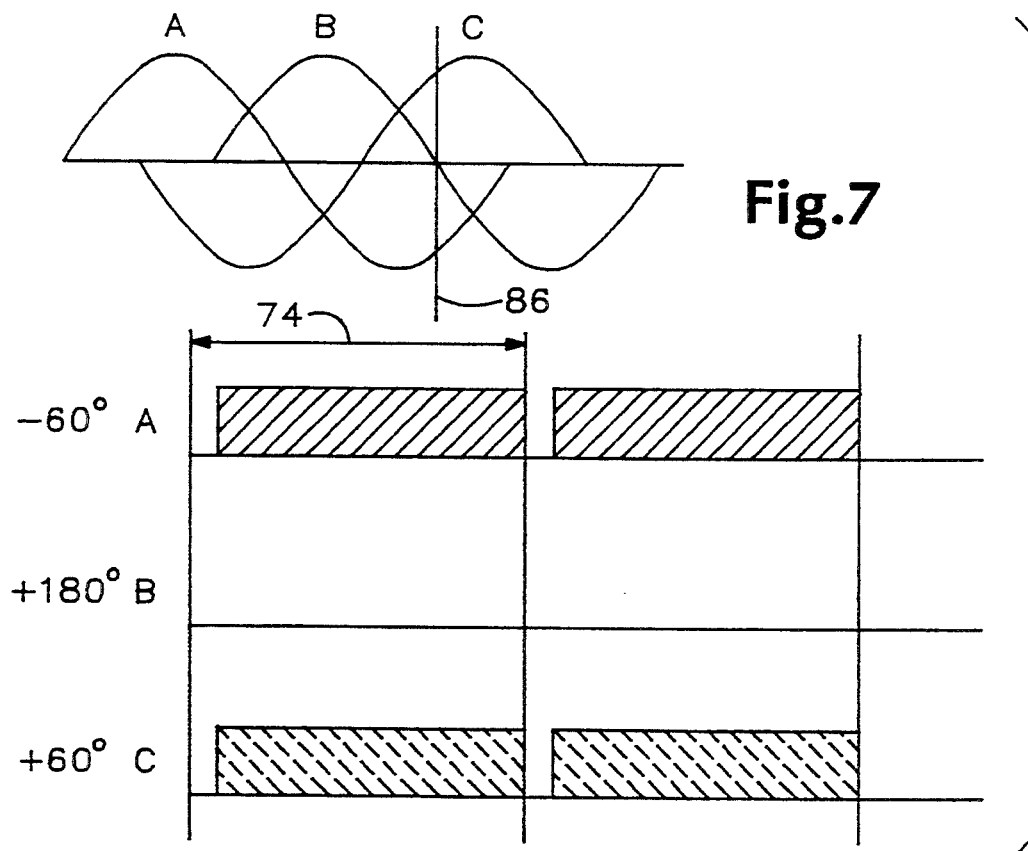
FIG. 7 is a pulse width modulated current waveform of a three phase current when phase A is −60 degrees for the control circuit of FIG. 1.
Figure 8:
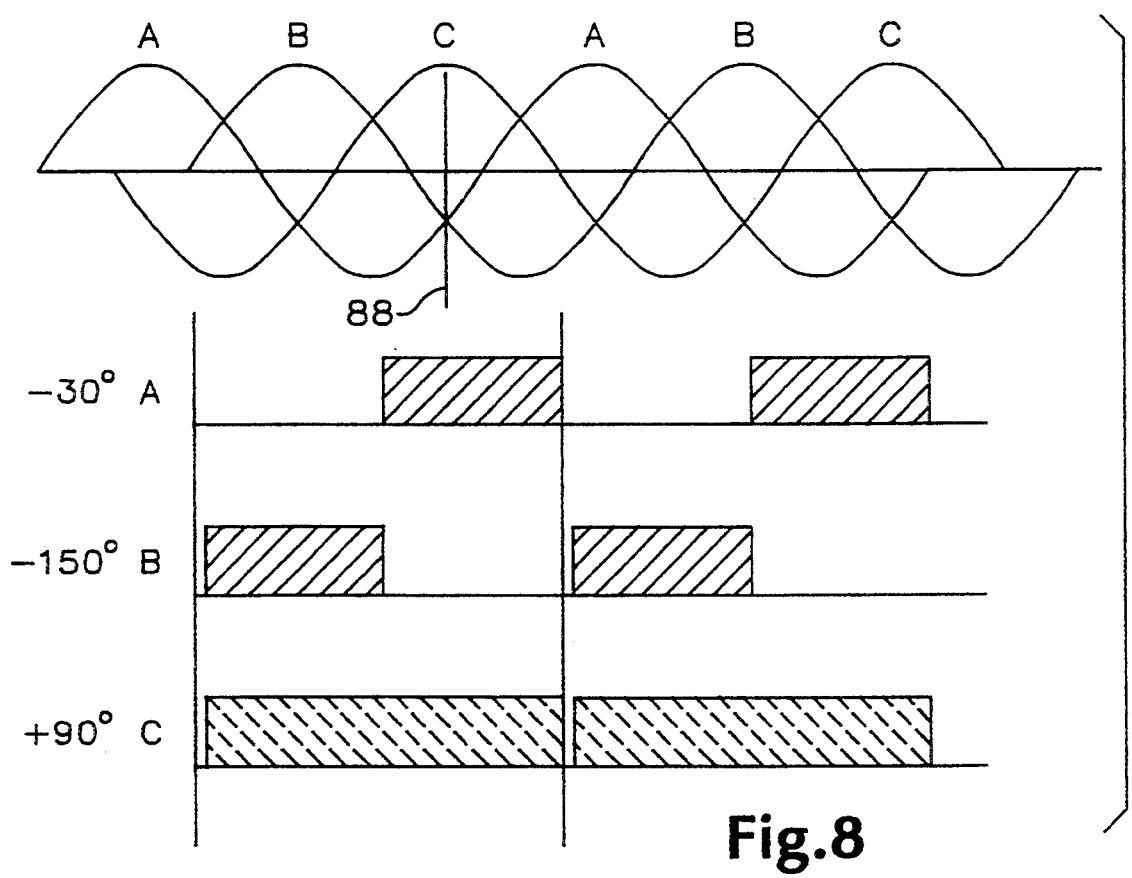
FIG. 8 is a pulse width modulated current waveform of a three phase current when phase A is −30 degrees for the control circuit of FIG. 1.
Figure 9:
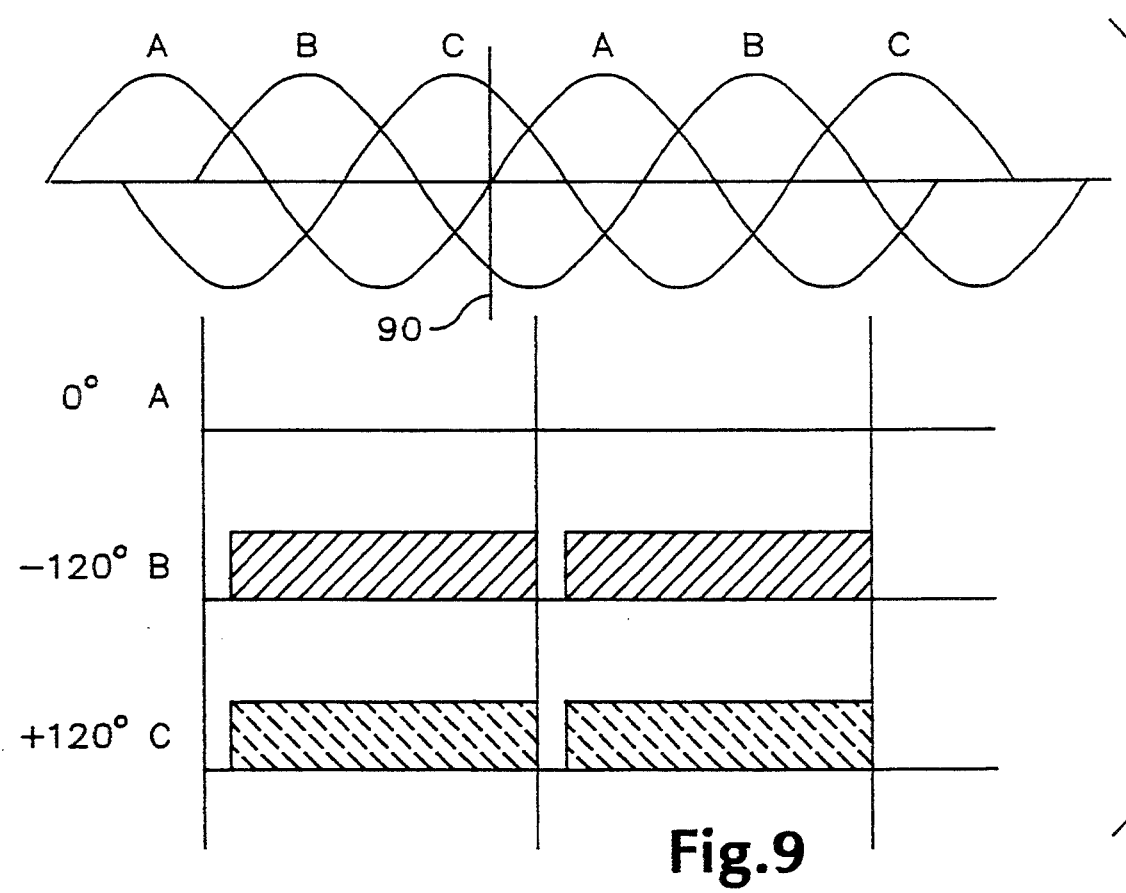
FIG. 9 is a pulse width modulated current waveform of a three phase current when phase A is 0 degrees for the control circuit of FIG. 1.
Figure 10:
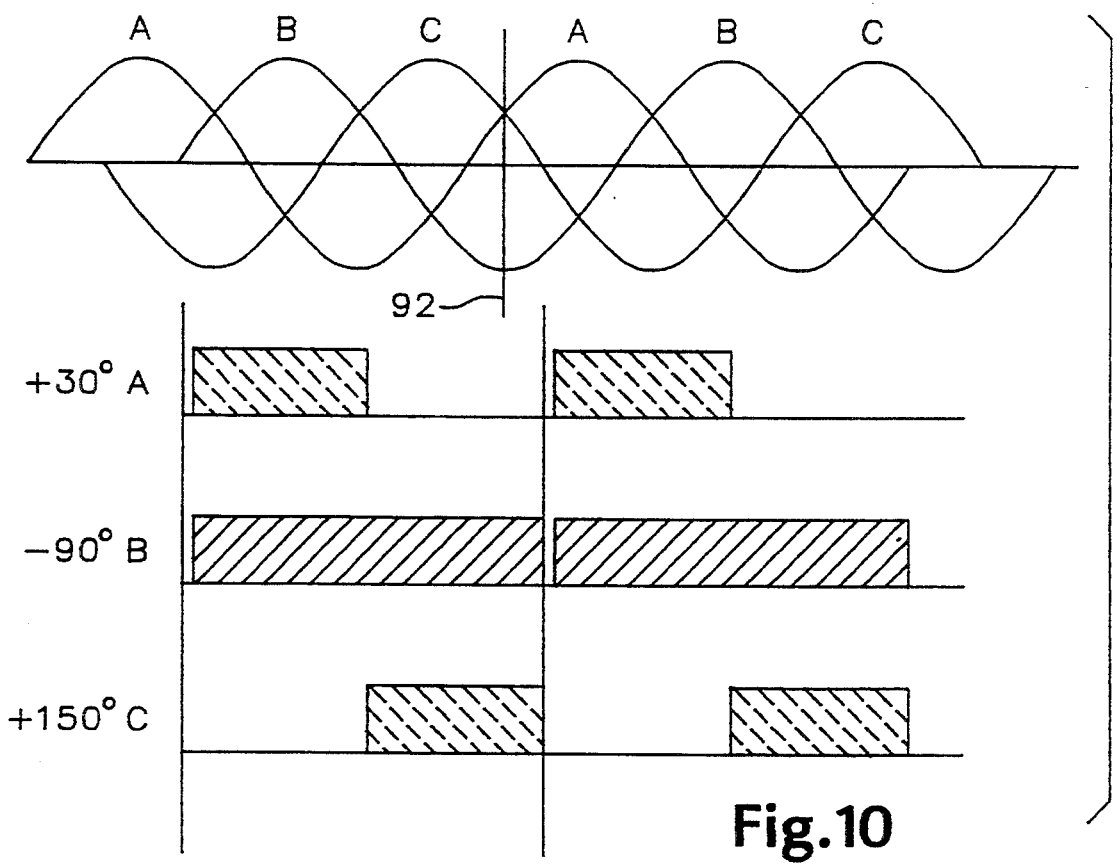
FIG. 10 is a pulse width modulated current waveform of a three phase current when phase A is +30 for the control circuit of FIG. 1.
Figure 11:
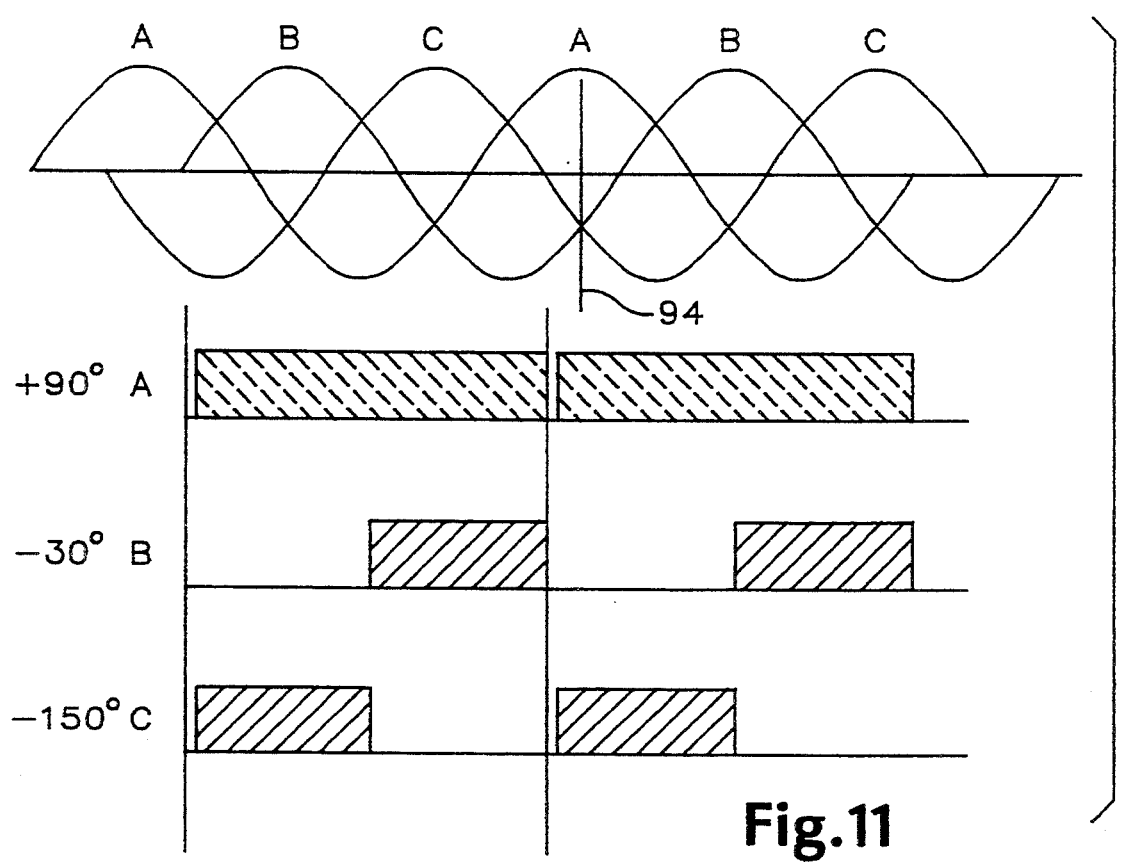
FIG. 11 is a pulse width modulated current waveform of a three phase current when phase A is +90 for the control circuit of FIG. 1.
Figure 12:
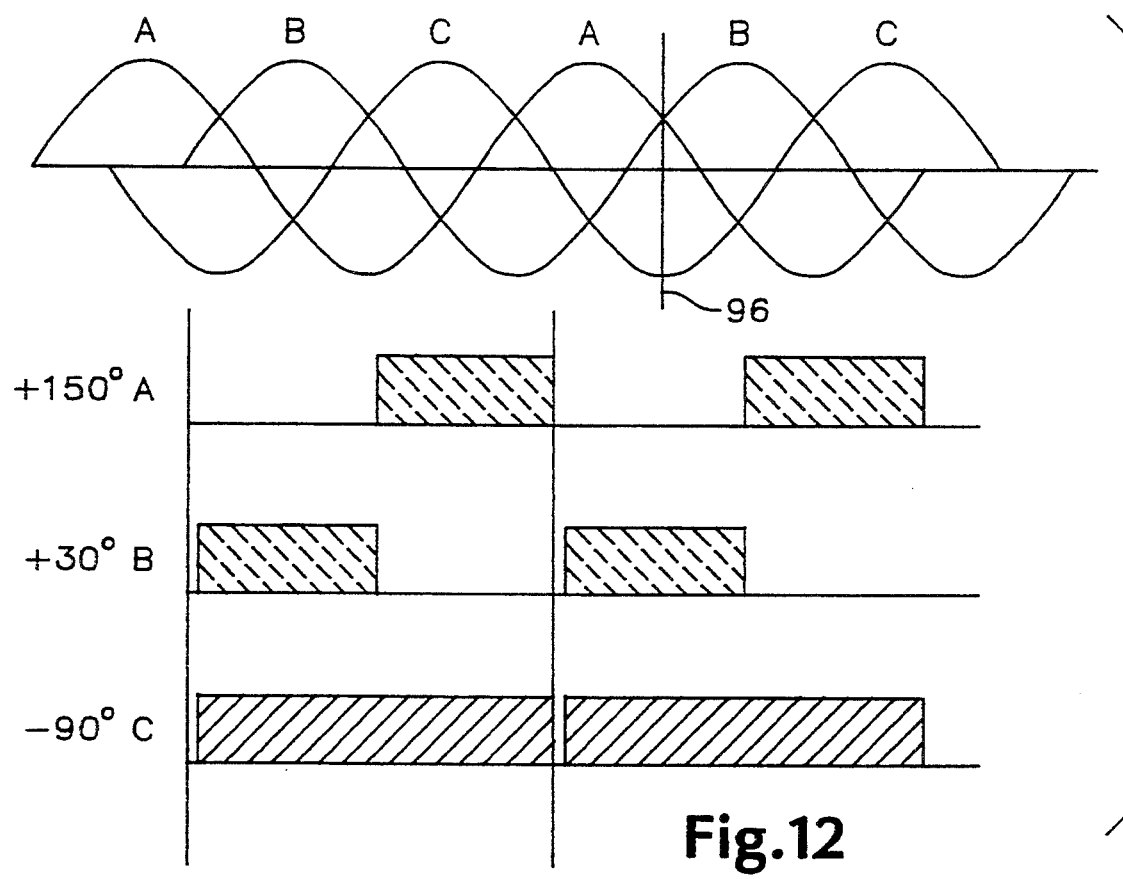
FIG. 12 is a pulse width modulated current waveform of a three phase current when phase A is +150 for the control circuit of FIG. 1.
Figure 13:
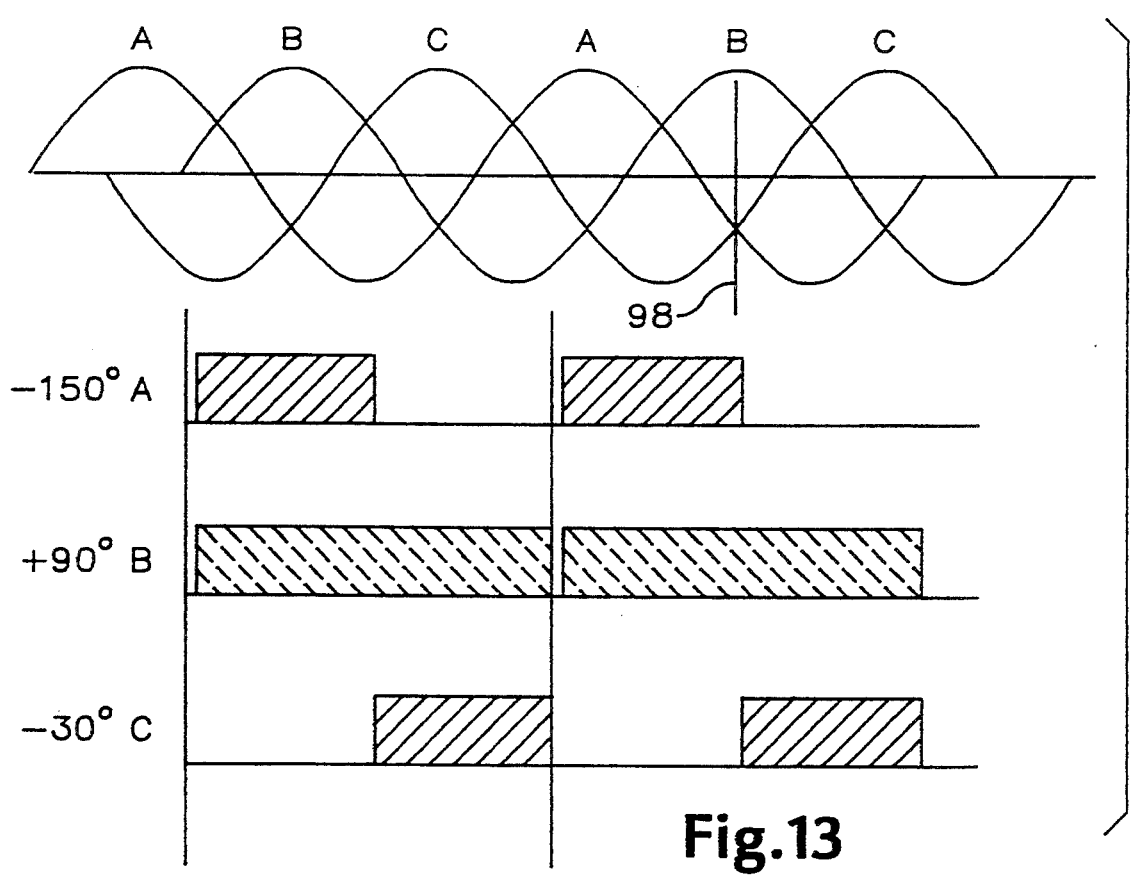
FIG. 13 is a pulse width modulated current waveform of a three phase current when phase A is −150 for the control circuit of FIG. 1.
Figure 14:
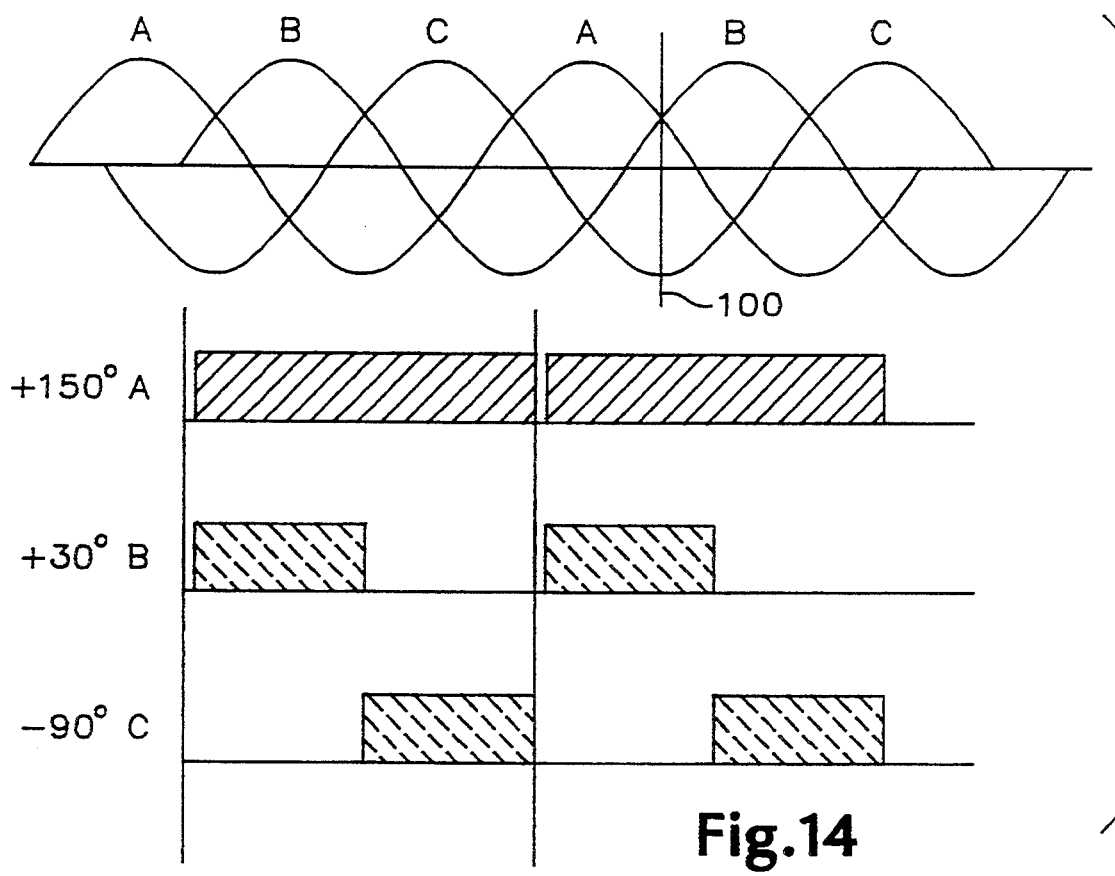
FIG. 14 is a pulse width modulated current waveform of a three phase current when phase A is +150 for the control circuit of FIG. 1.
Figure 15:
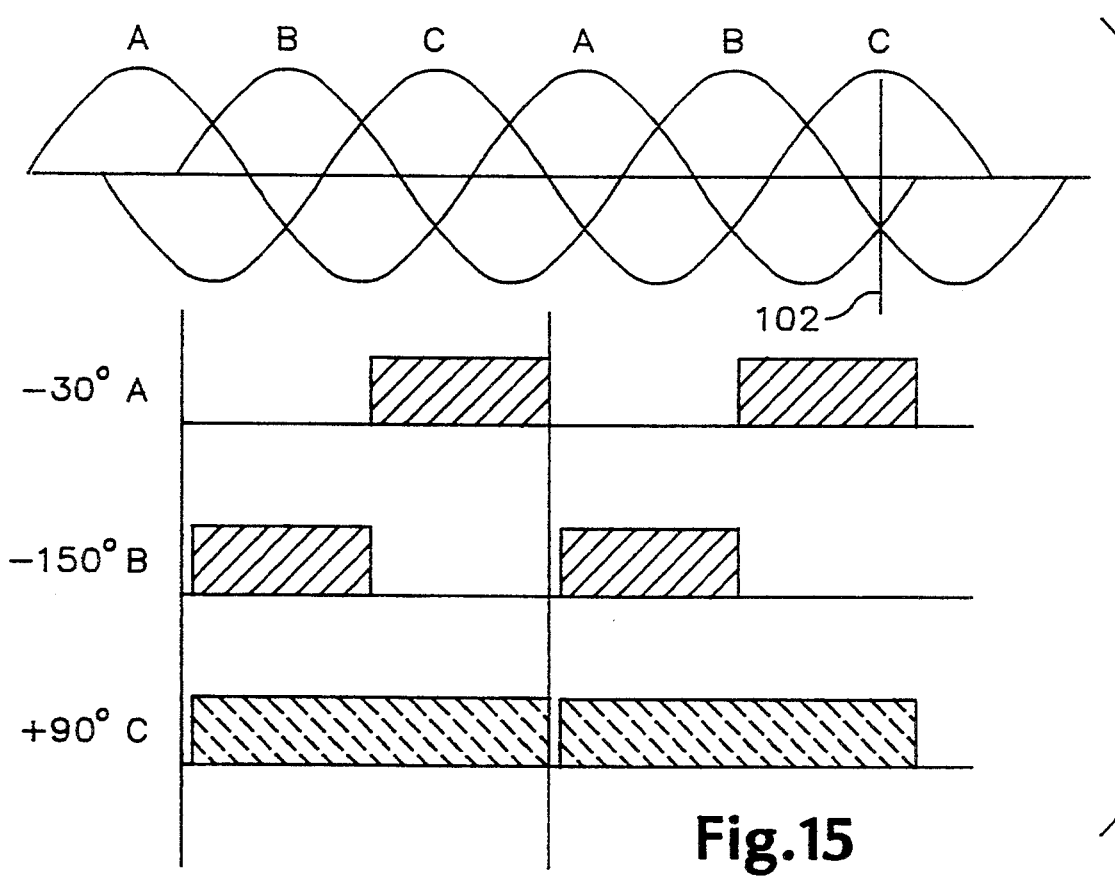
FIG. 15 is a pulse width modulated current waveform of a three phase current when phase A is −30 for the control circuit of FIG. 1.

FIG. 7, shows a representation at time 86 with phase A at −60 degrees, phase B is 180 degrees and phase C is +60 degrees. Phase A and phase C, each of opposite polarities, are activated for only 86.6% of the frame period 74 to maintain a constant torque on the motor 18.

FIGS. 8, 9, 10, 11, 12, 13, 14 and 15, respectively, show current representations of phase A, B and C at −30/−150/+90 degrees, 0/−120/+120 degrees, +30/−90/+150 degrees, +90/−30/−150 degrees, +150/+30/−90 degrees, −150/+90/−30 degrees, +150/+30/−90 degrees, and −30/−150/+90 degrees for respective times 88, 90, 92, 94, 96, 98, 100, and 102.

In order to assist the switched current from the H Bridge 16 to enter each motor terminal, 24a, 24b, and 24c, the high frequency impedance of the motor 18 should be lowered substantially. A motor 18 typically appears inductive at the pulse width modulated frequency. Therefore, three capacitors are connected from the motor terminals 24a, 24b, and 24c to a neutral lead 25. These capacitors effectively filter out the effects of the motor inductance at the pulse width modulated frequency, while providing minimal phase shift to the supplied current at the motor's electrical frequency. A further benefit of these capacitors is the reduction of pulse width modulated voltage spikes measured on the motor terminals 24a, 24b, and 24c. Furthermore, the capacitors reduce eddy current losses from pulse width modulation chopping.

The currents imposed on the motor terminals 24a, 24b, and 24c drive the motor 18. The motor terminals 24a, 24b, and 24c have a back EMF (voltage) imposed on them by motor 18 operation that is a close approximation to the rotor position in the motor 18. This provides a method to approximate the rotor position without the use of flux sensors. The terminal voltages in many applications may be modeled as consisting primarily of the back EMF of the motor 18, which is closely related to the rotor position and hence to the torque angle of the motor 18. The alignment of the phase angles of the terminal voltages with the phase angles of the supplied currents is very close to the correct angular relation of the rotor to provide maximum torque during the period when the motor 18 is operating at full speed with the drive current reduced. Under such conditions the terminal voltages are primarily due to the back EMF of the motor 18. The phase information supplied to the system bus 14 is representative of the angle of excitation of the PWM currents supplied to the motor 18 and hence the proper angle of the terminal voltages from the motor 18. Preferably, the phase information has three words, each of which is representative of the cosine of the phase angle of one phase of the current waveform provided to the motor 18.

A further advantage of the present drive scheme is that at low speeds the terminal voltages can be sensed even with very high currents in the motor 18, and lock-in for the driver may occur at speeds down to 5 percent or less of the rated speed, even at full currents. This sensitive lock-in is due to the high sensitivity of the phase detector which responds to small changes in the phase angle caused by small amounts of back EMF.

The three motor terminals 24a, 24b, and 24c are connected to respective references of digital to analog converters (DAC's) 22a, 22b, and 22c. The DAC's 22a–22c are preferably multiplying DACs that are configured for four quadrant multiplication. The timing latch 26, which is driven by a clock 27, selects the appropriate digital-to-analog-converters (DAC's) 22a, 22b, and 22c, when the phase information for that phase is on the system bus 14, as previously described. The DAC's 22a, 22b, and 22c multiply the cosine of the phase angle provided on the system bus 14 to the respective terminal voltages of the terminals 24a, 24b, and 24c. In other words, the DACs 22a–22c multiply the respective terminal voltages and the cosine of the phase angle of the excitation (phase information). The outputs of the DACs 22a, 22b, and 22c, are summed together by the summer 28 to generate a total phase error signal on line 30. The output of the summer 28 is used as input to the Proportional Integrator (PI) Filter A 32 which produces a non-zero constant voltage output with a zero input and ramps itself up until the error is zero. The output of PI filter A 32 is used as the input to a voltage controlled oscillator (VCO) 34 which causes the MSB counter 44 to count, e.g. selects the next appropriate frame from the PWM driver 12. For no phase error the PI filter A 32 will cause the VCO 34 to oscillate.

The three DAC's 22a, 22b, and 22c use the terminal voltages 24a, 24b, and 24c as their references. This results in emulating the trig identity:

$$\sin(\text{ThetaVmtr})*\cos(\text{ThetaIcmnd}) +$$
$$\sin(\text{ThetaVmTr} + 120)*\cos(\text{ThetaIcmd} + 120) +$$
$$\sin(\text{ThetaVmtr} - 120)*\cos(\text{ThetaIcmd} - 120) =$$
$$1.5*\sin(\text{ThetaVmtr} - \text{ThetaCmnd})$$

where:

ThetaVmtr = phase angle of motor voltage phase A
ThetaIcmnd = phase angle of driver current phase A The left side of the above equation is emulated by the DAC's 22a, 22b, and 22c together with the summer 28. The right side of the above equation is the output of the summer 28.

Derivation of the preceding results in the following:

phase $A$
$\sin(x)*\cos(y) = (1/2)*(\sin(x + y) + \sin(x - y))$
phase $B$
$\sin(x + 120)*\cos(y + 120) = (1/2)*\sin(x + y + 240) + \sin(x - y))$
phase $C$
$\sin(x - 120)*\cos(y - 120) = (1/2)* (\sin(x + y - 240) + \sin(x - y))$ Since the three summing terms on the right side of the equal sign of the three previous equations are three equal amplitude vectors all 120 degrees out of phase, these terms must sum to zero. After dropping the summing terms, the sum of all the remaining difference terms is:

$$\sin(x)*\cos(y)+\sin(x+120)*\cos(y+120)+\sin(x-120)*\cos(y-120)=(3/2)*\sin(x-y)$$

This identity is the three phase equivalent of:

$$\sin(x)\cos(y)+\cos(x)\sin(y)=\sin(x-y)$$

x = current excitation angle from the EPROM 52
y = voltage angle at motor terminal voltage
Overall, the summation of the three DAC 22a, 22b, and 22c provides a voltage equal to the one and one half times the sin of the phase difference between angle of the terminal voltage and angle of the current command. DAC A is sin(x)cos(y), DAC B is sin(x+120)cos(y+120), and DAC C is sin(x−120)cos(y−120).

Tight control over the phase error results in the ability to obtain fast phase lock up and a high bandwidth in the ability to track the voltage and current, and, hence, rotor position. With most motors today, it is nearly impossible for the motor to outrun the current excitation. By means of classical servo analysis methods, any desired bandwidth can be selected for the voltage/current loop.

When the motor 18 is rotating slowly the MSB counter 44 will not be changing rapidly as compared to a cycle through LSB counter 42 (count from zero to 127). As a result the same value may be latched into the latch 48 during consecutive frames causing the same frame to be repeated several times. As the motor 18 increases rotor speed the MSB counter 44 will count more rapidly causing a faster rate of different frames of digital data to be outputted from the EPROM 52.

In this way, the frequency of the present design allows the circuit to continue to function at VCO 34 frequencies much higher than the PWM frequency. A negative effect of a higher VCO 34 frequency than the PWM frequency is a slight loss in the resolution of the excitation waveform, since the waveform information in the EPROM is periodically skipped over due to the hetrodyning with this higher frequency.

Figure 2:
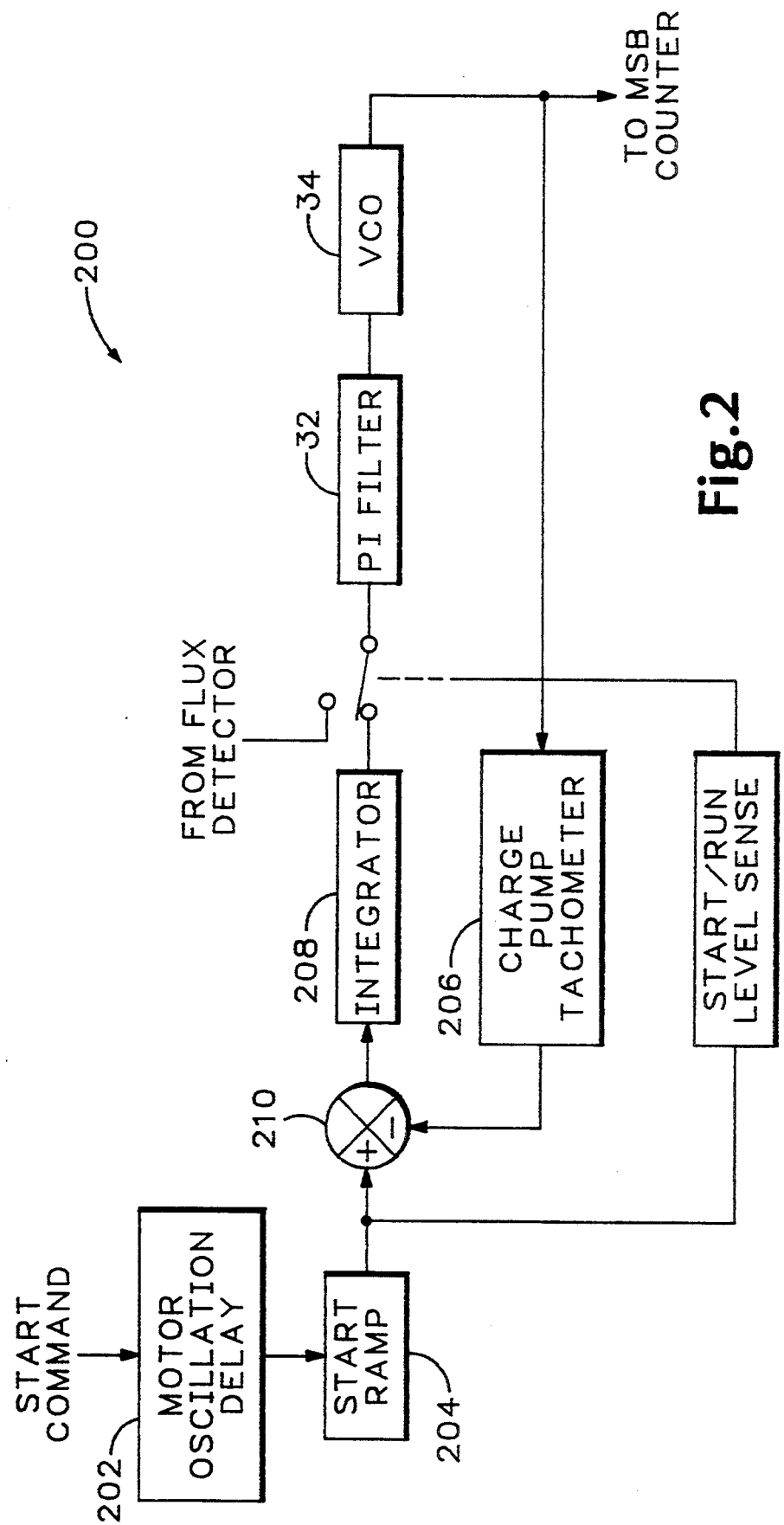
FIG. 2 is a schematic block diagram of a starting loop for the control circuit of FIG. 1.

Referring to FIG. 2, a starting loop is implemented with an additional ramp input circuit 200. Initially, the motor 18 is energized then allowed to come to a rest by a suitable motor oscillator delay 302. This allows the torque to come to zero so the starting position of the rotor is known. Then a start ramp 204 is begun, causing the voltage frequency input to a summer 218 to increase linearly with time. This constant acceleration assures that the motor 18 will ride to one side of the zero torque well, and will not oscillate during the ramp-up phase of the start cycle. To assure a linear ramp in frequency of the VCO 34, a charge pump tachometer 206 within the start loop measures the VCO's 34 frequency, which may not be linear, to assure that the error output of the comparator 210 is minimized to maintain a linear ramp in the VCO's 34 frequency. Also, an integrator 208 within the loop assures a very small ramp error (the ramp error is that voltage required to drive the integrator 208 to assure adequate voltage on the VCO 34 during the ramping period). The amount of the integration is chosen to assure that the ramp signal can be generated with a tracking error of less than 1%. The charge pump tachometer 206 also filters the ramp frequency from the VCO 34. The output of charge pump tachometer 206 is input to the P/I filter A 32 (FIG. 1). Since the ramp input circuit is a frequency control loop (velocity control), the loop order is one less than that of the phase lock loop, and the additional integration pole at the origin does not require another zero. This is because the charge pump tachometer 206 acts as its own zero, cancelling the pole effect of the VCO 34.

The start loop employs a comparator 210 that senses a ramp voltage correlating to a sufficient rotational speed to assure adequate back EMF for lock-in to take place. The comparator causes the input to the PI Filter A 32 and VCO 34 to switch from the ramp input circuit 200 to the driver circuit 11 (vector phase detector). The correct voltage for the VCO 34 speed is already present on the VCO 34 at the instant of crossover. However, the VCO speed must then be adjusted slightly to correct for the lagging phase of the VCO 34. Hence, the VCO 34 will speed up, find the correct phase angle for the excitation vector, and then slow down to assume the speed of the motor 18. All this switchover happens within milliseconds, with the sole effect of producing a slight audible 'click' in the motor 18. The motor 18 will then operate with the new optimal torque.

Figures 3, 4:
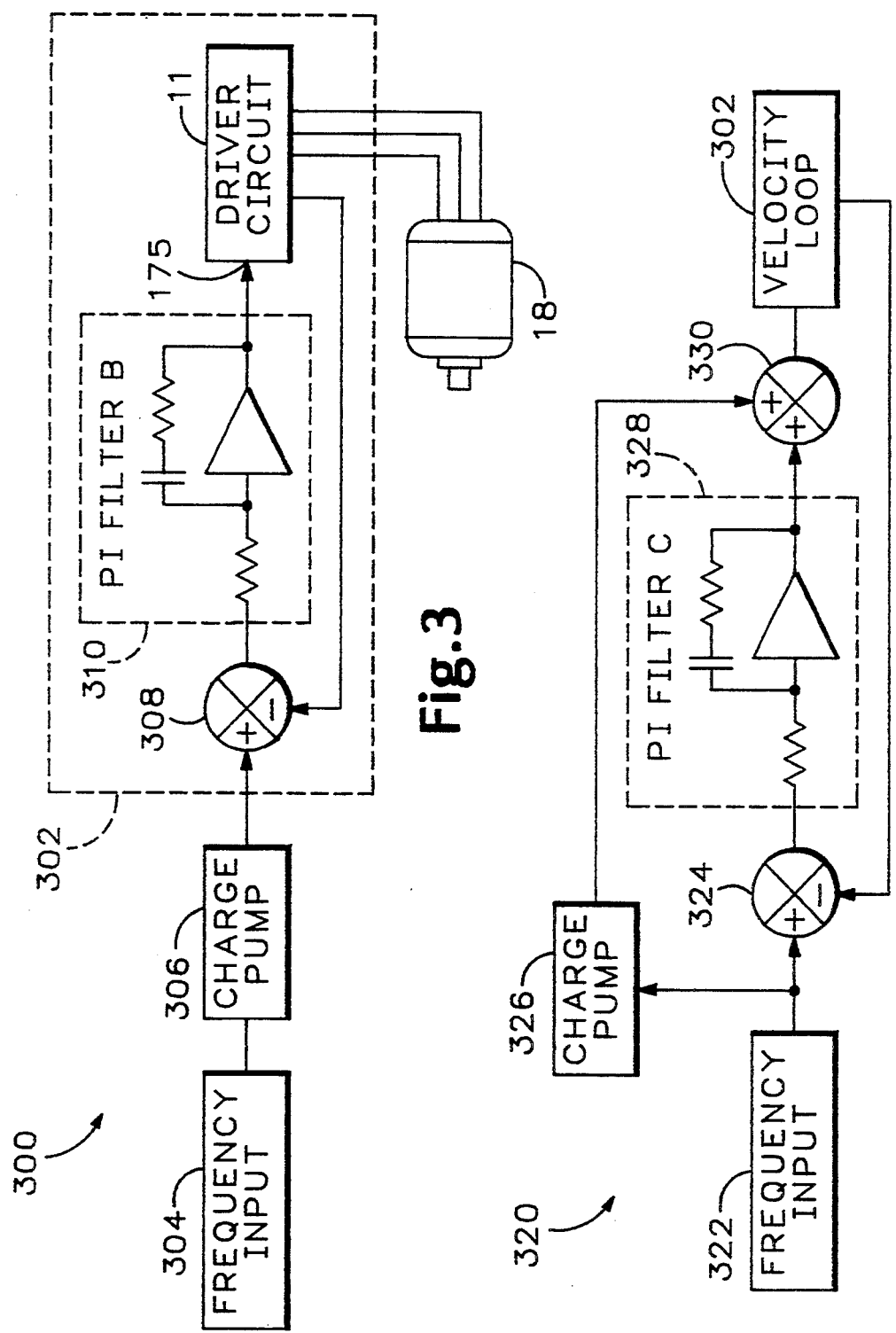
FIG. 3 is a schematic block diagram of a speed control circuit for the control circuit of FIG. 1.
FIG. 4 is a schematic block diagram of a position control circuit for the control circuit of FIG. 1.

FIG. 3 shows a speed control circuit 300 for controlling the speed of the motor 18. The speed circuit 300 includes a velocity loop 302 that uses a frequency input 304 passed through a charge pump 306 as the positive input to a summer 308. The summer 308 receives a negative input from the output of the VCO 34 of the driver circuit 11. The output of the summer 308 is the input to a PI Filter B 310 which assures no speed error at a steady state speed and introduces a pole and a cancelling zero. The output of the PI Filter B 310 is the input to the torque control 75 connected to the current source 71 of the driver circuit 11. Overall, a larger frequency input 304 results in more current from the current source 71 to increase the speed of the motor 18.

The fast phase locked loop of the driver circuit 11 introduces two poles and a zero that must be addressed in the choice of limits on the bandwidth for the velocity loop 302. The inertia of the motor 18 introduces a third pole. Typically, the closed loop bandwidth of the velocity loop 302 is chosen to be at least one tenth the bandwidth of the phase locked loop of the driver circuit 11, and should not be faster than one fifth or ringing will occur.

FIG. 4 shows a position control circuit 320 for controlling the position of the motor 18. The position circuit 320 includes a frequency input 322 that is the input to a phase detector 324 (positive) and a charge pump 326. The charge pump 326 functions as a tachometer converting frequency to voltage. The negative input of the phase detector 324 receives its input from either the motor electrical frequency or the output of the MSB counter 44 which would provide higher resolution than the motor electrical frequency. The output of the phase detector 324 is the input to a PI Filter C 328. The PI Filter C 328 assures no steady state position error. The PI Filter C 328 and charge pump 326 provide the inputs to the summer 330 which in turn provides input to the velocity loop 302, as shown in FIG. 3. The position circuit 320 has a bandwidth limited to one tenth that of the velocity loop 302.

Figure 5A:
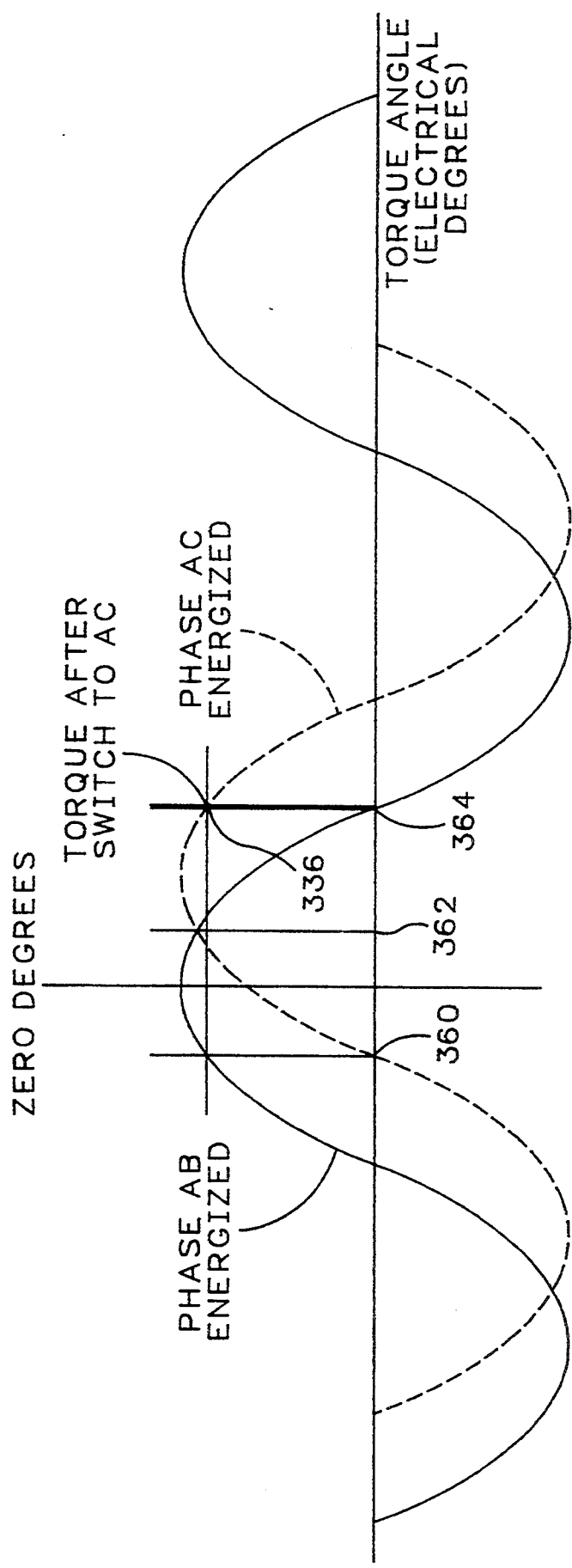
FIG. 5A is a torque waveform diagram for a motor illustrating the starting torque using a six step synchronous drive.

FIG. 5A shows a representation of the torque ripple effects of starting a motor using a six step scheme. Under classical Hall commutation, phase AB is energized at the point 360 corresponding to 30 degrees prior to the peak of the torque. Phase AC is then energized at a point 362 corresponding to 30 degrees after the peak of phase AB. In conventional six step sensorless schemes AB is energized with no regard to rotor position causing the rotor to continue to rotate until it has reached position 364, which is a rotor angle of 90 degrees after the peak of phase AB. The torque is zero at point 364 and the rotor will settle at this position. If phase AC is then energized, the new torque is at point 366, which is the falling side of AC's waveform at 30 degrees from its peak. This causes the rotor to experience a discontinuity of torque of 86.6% of its maximum available torque making motor starts rough.

Figure 5B:
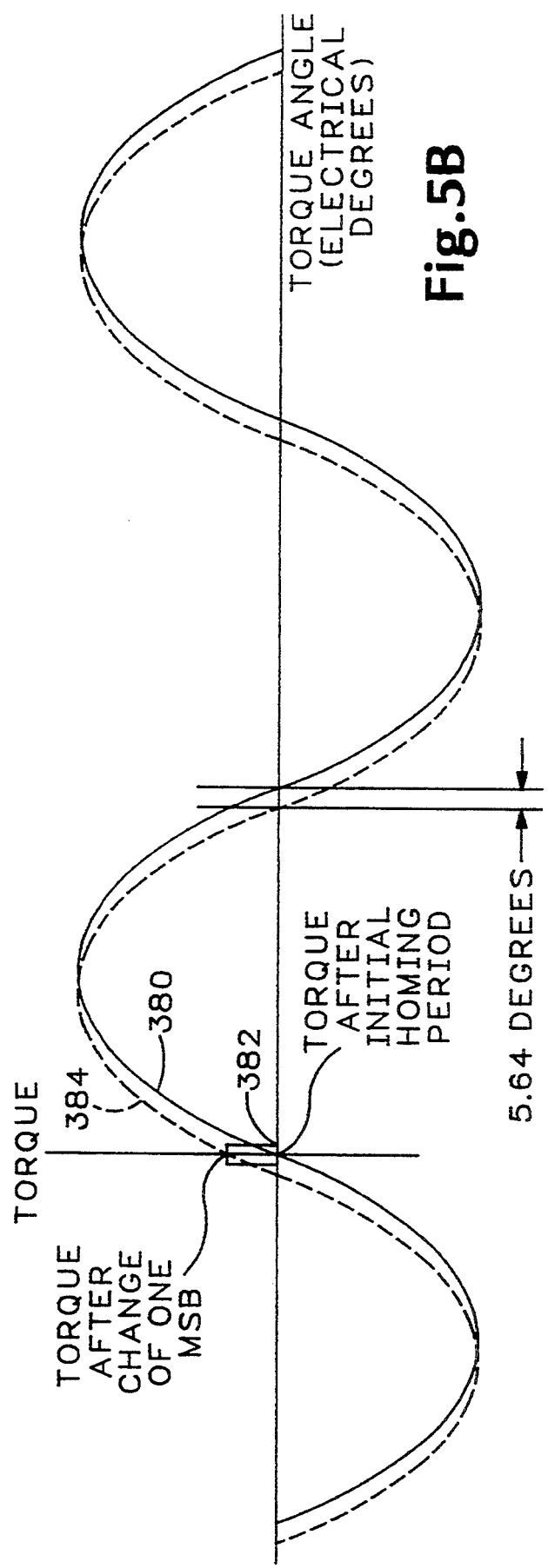
FIG. 5B is a torque waveform diagram illustrating the starting torque using the control circuit of FIG. 1.

FIG. 5B shows the starting torque effects of the preferred embodiment. The sold line 380 represents the torque angle of the motor 18 after the initial energizing pulse and after the motor 18 is allowed to settle to a stable position of zero torque. The motor 18 will settle to location 382. The dashed line 384 represents the new torque on the motor 18 after the excitation waveform has been shifted 5.64 degrees by changing the MSG counter 44 one bit. The instantaneous torque variations by changing the count on the MSB counter 44 are the sources of largest destabilizations and this is minimized in the preferred embodiment. The maximum amount of torque, which is the peak of the sine wave, is still available from the motor 18, if needed, by shifting the rotor angle toward the 90 degree point.

The motor 18 could be controlled in a stepper motor fashion by including an additional counter connected to the output of the MSB counter 44 or to the position circuit 320 to keep track of motor rotation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A control circuit for an electric machine, said electric machine having a plurality of stator windings energized by current signals comprising:
    (a) a driver circuit that generates pulse width modulated current signals responsive to an error signal that is representative of a phase angle error, where each of the respective said current signals is one phase of a multi-phase signal;
    (b) said driver circuit generates phase information associated with said current signals;
    (c) said machine having a plurality of input terminals, each of which receives a respective one of said current signals; and
    (d) a multiplier circuit for multiplying the terminal voltage of at least one of said terminals with said phase information to generate said error signal.

2. The control circuit of claim 1 wherein said driver circuit further comprises:
    (a) a first counter that recursively generates first binary values counting from a first starting value to a first ending value;
    (b) a second counter that recursively generates second binary values, responsive to said error signal, counting from a second starting value to a second ending value;
    (c) said first counter generating a carry out signal that is received by a latch circuit, said latch circuit receiving a selected one of said second binary values;
    (d) a memory for generating digital data in response to the simultaneous addressing of said memory by both said selected one of said second binary values and one of said first binary values; and
    (e) a generator circuit for producing said pulse width modulated current signals in response to said digital data.

3. The control circuit of claim 2, wherein said memory further includes:
    (a) said digital data arranged as a plurality of frames in said memory;
    (b) wherein each of said frames includes said phase information and current information representative of said pulse width modulated current signals.

4. The control circuit of claim 1 wherein said driver circuit further comprises:
    (a) a pulse width modulator driver that generates digital data representative of said pulse width modulated current signals; and
    (b) a generator circuit that produces said pulse width modulated current signals in response to said digital data.

5. The control circuit of claim 1, wherein:
    (a) two of said pulse width modulated current signals have the same first polarity;
    (b) at least one pulse width modulated current signal has a polarity opposite said first polarity.

6. The control circuit of claim 1, wherein all of said pulse width modulated current signals have the same magnitude.

7. The control circuit of claim 1 wherein said multiplier circuit further includes:
    (a) a product circuit that multiplies the terminal voltage of each of said terminals with said phase information to generate multiplication signals; and
    (b) a summation circuit that generates said error signal which comprises said multiplication signals summed together.

8. A method for controlling an electric machine, said electric machine having a plurality of stator windings energized by current signals, said method comprising the steps of:
    (a) generating in a driver circuit pulse width modulated current signals in response to an error signal that is representative of a phase angle error, where each of the respective said current signals is one phase of a multi-phase signal;
    (b) generating in said driver circuit phase information associated with said current signals;
    (c) receiving in each one of a plurality of input terminals of said machine a respective one of said current signals; and
    (d) generating said error signal by multiplying the terminal voltage of at least one of said terminals with said phase information.

9. The method of claim 8 wherein two of said pulse width modulated current signals have the same first polarity and a third said pulse width modulated current signal has a polarity opposite said first polarity.

10. The method of claim 8 wherein all of said pulse width modulated current signals have the same magnitude.

* * * * *